(12) United States Patent
Chainer et al.

(10) Patent No.: US 6,397,334 B1
(45) Date of Patent: May 28, 2002

(54) METHOD AND SYSTEM FOR AUTHENTICATING OBJECTS AND OBJECT DATA

(75) Inventors: Timothy Joseph Chainer, Mahopac; Claude A. Greengard, Chappaqua; Paul Andrew Moskowitz, Yorktown Heights; Alejandro Gabriel Schrott, New York; Charles P. Tresser, Mamaroneck; Robert Jacob von Gutfeld, New York; Chai Wah Wu, Poughquag, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,179

(22) Filed: Dec. 17, 1998

(51) Int. Cl.[7] ............................. H04L 9/00; G06F 17/16; H04N 7/167
(52) U.S. Cl. ................. 713/176; 713/186; 713/168; 713/177; 713/178; 713/179; 713/185; 705/4; 380/202; 380/210; 380/200
(58) Field of Search ................... 713/185–186, 713/176–179, 168, 4; 380/202, 210, 200

(56) References Cited

U.S. PATENT DOCUMENTS

| | | | | |
|---|---|---|---|---|
| 5,274,421 A | * | 12/1993 | Takahashi | 355/69 |
| 5,451,758 A | * | 9/1995 | Jesadanont | 235/384 |
| 5,499,294 A | | 3/1996 | Friedman | |
| 5,554,984 A | * | 9/1996 | Shigenaga et al. | 340/937 |
| 5,583,507 A | * | 12/1996 | D'Isepo et al. | 342/45 |
| 5,719,939 A | * | 2/1998 | Tel | 380/23 |
| 5,822,436 A | * | 10/1998 | Rhoads | 380/54 |
| 5,898,779 A | * | 4/1999 | Squilla et al. | 380/23 |
| 5,974,150 A | * | 10/1999 | Kaish et al. | 380/25 |
| 5,995,630 A | * | 11/1999 | Borza | 380/54 |
| 6,199,044 B1 | * | 3/2001 | Ackley et al. | 704/275 |
| 6,269,446 B1 | * | 7/2001 | Shumacher et al. | |

* cited by examiner

*Primary Examiner*—Gilberto Barron, Jr.
*Assistant Examiner*—Gregory Newton
(74) *Attorney, Agent, or Firm*—Stephen C. Kaufman, Esq.; McGinn & Gibb, PLLC

(57) ABSTRACT

A system and method for authenticating an image of an object, include at least one identifier associated with the object, a receiver for interrogating the at least one identifier to produce identification information, a camera system for recording an image from the object including the at least one identifier, and a composite generator for encoding the identification information from the receiver along with the image acquired by the camera system, to produce composite data.

69 Claims, 2 Drawing Sheets

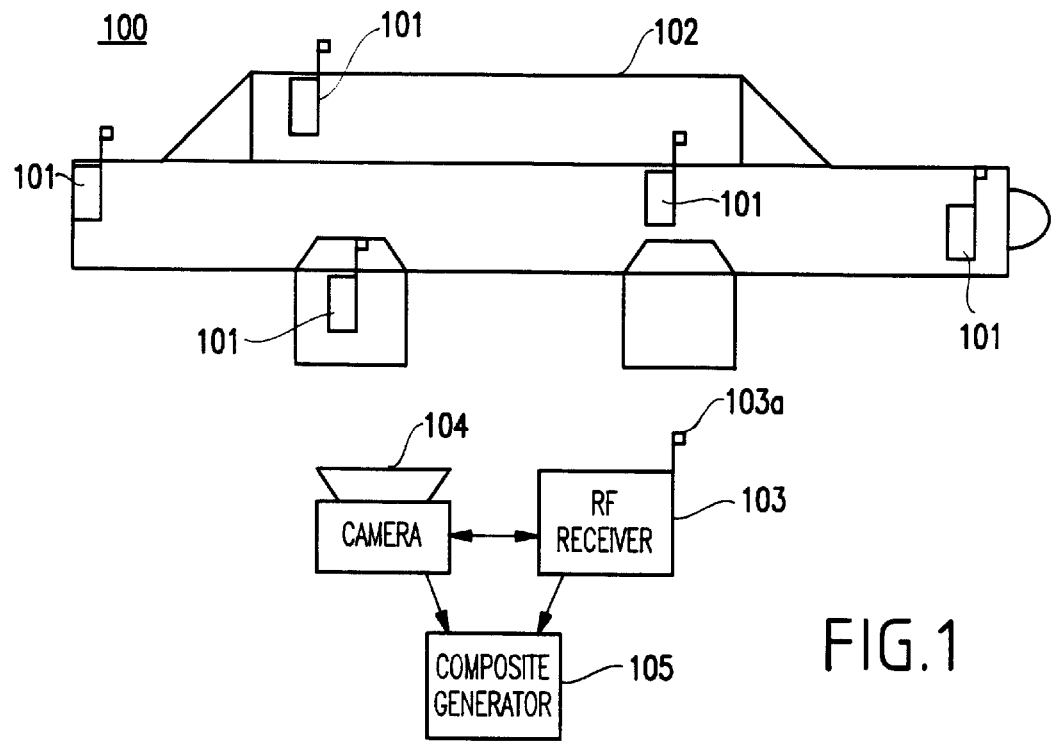
FIG.1
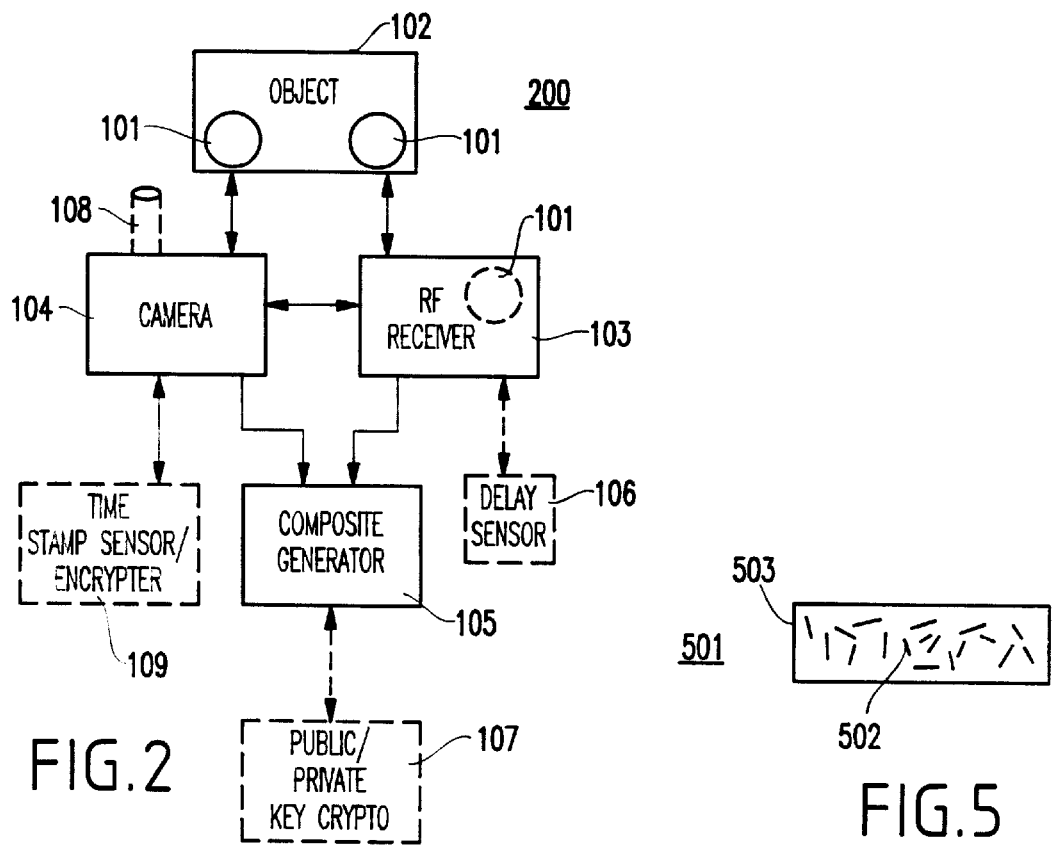
FIG.2
FIG.5

METHOD AND SYSTEM FOR AUTHENTICATING OBJECTS AND OBJECT DATA

BACKGROUND OF THE INVENTION

1. Field of the Invention

The present invention generally relates to a method and system for authenticating objects and object data.

2. Description of the Related Art

Many attempts have been made to falsify both animate and inanimate objects. One particularly important problem that confronts insurance agencies is the falsifying of damage and repairs, particularly though not exclusively, to motor vehicles (e.g., automobiles, trucks, motorcycles, etc.).

Oftentimes, cars are brought to a service station or auto body shop after an accident, and a photograph is taken of the damage. Thereafter, a second photograph is taken after the alleged repair. Then, the second photograph is submitted to the insurance company for collection of the fee. However, many times the second photograph (or both the first and the second photographs) has been altered (e.g., "doctored"), or the photographs are taken from another vehicle.

Thus, a fraud occurs on the insurance company at the hands of the unscrupulous repair shop and/or the vehicle owner.

Further, in some conventional systems, there is no method of preventing (or at least the detection thereof) taking the picture of an object that is not the object that was supposed to be represented (e.g., for insurance purposes).

For example, there is no method of detecting the recording of the image of a car in perfect shape (e.g., undamaged) which looks similar to a car that has been in an accident, and then sending this image to the insurance company for repair payments when the repair has actually not been undertaken.

A solution to the above problem requires the image taken by a camera to be an authentic image (e.g., an image that has not been altered). In one conventional system, an apparatus is provided which authenticates images acquired by a digital camera by encoding a digital signature and attaching it to the image.

In such a system, the digital camera uses cryptography to create a signature for authenticating the images generated. Specifically, a coded message is attached to the picture to allow for the authentication. Other information can also be attached to the image. However, the conventional system including such a digital camera does not reliably prevent (or at least detect) all forms of fraud. For example, the conventional system would not prevent the fraudulent activities described below.

First, the image presented to the digital camera may be a photograph, and not necessarily the actual image of the condition of the object (e.g., vehicle). Thus, such a photograph could easily have been altered.

Secondly, the additional information attached to the image such as temperature etc., could come from another source and made to appear to come from the location of the digital camera, via various types of relays and intermediary devices/nodes. Thus, even if the conventional system may overcome some of the above-described problems such as tampering and the like, there are still drawbacks present. For example, such systems cannot distinguish between look-alike items such as one obtains from mass production (e.g., consumer electronics such as televisions, video tape recorders, and the like, motor vehicles such as automobiles, motorcycles, and boats, artwork, expensive clothing, etc.).

Thus, fraudulent practices are not reliably prevented, thereby costing the insurance companies (and ultimately the legitimate policyholders) hundreds of millions of dollars per year.

SUMMARY OF THE INVENTION

In view of the foregoing and other problems of the conventional systems and methods, it is an object of the present invention to provide a method and system for preventing the presentation of false images, and more specifically the false presentation of, for example, damages as well as false presentation of subsequent repairs.

Another object of the present invention is to provide a structure and method which combines a camera and a reader (e.g., a radio frequency (RF) reader) that simultaneously records both an image of an object and a sequence of bits assigned to at least one tag, associated with the object, which corresponds to the identification of the object.

Yet another object is to provide a system and method of authenticating data alleged to be associated with a physical object, by using more than one kind of information about the object, and storing it in a secure manner. This system and method can be used in combination with a photograph to provide authentication of the digital image.

In a first aspect, a system for authenticating an image of an object, includes at least one identifier associated with the object, a receiver for interrogating the at least one identifier, a camera system for recording an image from the object including the at least one identifier, and a composite generator for receiving an input from the camera system and the receiver, such that identification information from the receiver is encoded along with the image acquired by the camera system, and the composite generator generating composite data.

In the simplest configuration of the present invention, the above problems of the conventional systems and methods are overcome by the inventive system including one or more tags (e.g., a radio frequency (RF) tag, a magnetic tag, a Smart Card, a bar code, a biometric identifier, etc.) associated with the object such that the tags cannot be removed without the tag(s) being destroyed. Each tag is provided with a different or unique ID.

Returning to the exemplary embodiment directed to automobile repairs, preferably several tags are attached in various positions on the automobile so that at least one tag will survive a typical automobile accident.

When the damage of the car is assessed, a composite optical-radio frequency identification (RFID) photo is taken. To produce such a photograph, the camera is focused on the damaged part or parts of the vehicle, each preferably containing a tag so that the ID can be read as the optical photograph is taken and placed on the photo as a "water mark" for authenticity purposes. After repair, a composite optical-RFID photograph is taken again with the same camera/RF reader and submitted to the insurance company together with the original photograph for comparison of the photographs (and the optical signatures of the tags).

Further, it is noted that a device for providing a time stamp and/or for determining distance also may be provided. For example, a light beam such as that used in a rangefinder may be used for measuring distance. Alternatively, an acoustic sensor could be used to measure the distance from the camera to the object of interest. Such a distance measuring feature provides a greater level of reliability and would serve to deter the establishment of relays and the like for taking fraudulent images, typically remotely positioned with respect to the actual object.

Additionally, the present invention provides a system and method for authenticating information about an object by simultaneously extracting at least two properties of an object, and possibly of its environment, such as the photographic image and the temperature, and encrypting these measurements together, using a private key, in a combined data set. The encrypted information can be made available to a remote user of this information, either through a public or a private key decryption.

For example, as mentioned above, a photographic picture of an object provides a remote party some information about the object, but that information may not be authentic, even with authentication of the photograph through watermarking, for example, since the photograph may have been made of a fraudulent model of the object, or from a computer screen, rather than of the object itself. By combining photographic imaging with other kinds of sensing, greatly enhanced authentication is possible. This applies as well to pictures taken by video cameras. Furthermore, the primary source of information need not be visual, and thus the invention enhances the credibility of any recording.

One of the properties of the object may be its identity as confirmed by a tag. By simultaneously sensing (and encrypting) broadcast identity information from an identifying tag, embedded in or attached to the object, with other sensed information, greater confidence in the relationship between the measured data and the specifically identified object can be achieved.

Further, the present invention may utilize fragile watermarking for authenticating the relationship between data allegedly extracted from a physical object and the object itself This invention enables users of information about physical objects to have enhanced confidence about the authenticity of this information. The invention preferably uses fragile watermarking of several data sets created simultaneously. The verification process can be performed using either public or private keys, or a combination thereof.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a schematic diagram of a system according to a first preferred embodiment of the present invention;

FIG. 2 illustrates a system according to the present invention;

FIG. 5 illustrates a tag 501 having a variety of dipoles for use with the present invention.

DETAILED DESCRIPTION OF REFERRED EMBODIMENTS OF THE INVENTION

Figure 3:
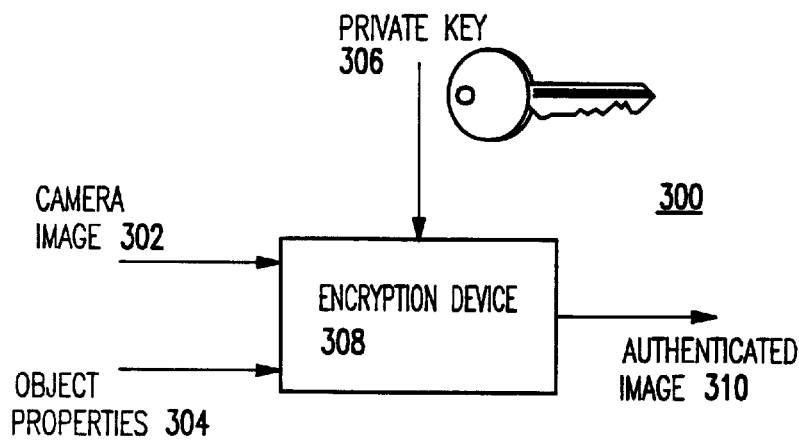
FIG. 3 is a diagram of encrypting two types of data from an object to create an authenticated image.

Referring now to the drawings, and more particularly to FIG. 1, a system 100 according to a first preferred embodiment of the present invention is shown.

As shown, the system 100 includes at least one tag 101 associated with (e.g., attached to, held by, mounted on, etc.) an object 102. Preferably, a plurality of tags 101 are provided associated with the object 102 for even greater reliability. Preferably, the tags are radio frequency identification (RFID) tags exposed to the ambient and visible by the imaging system, such that an image from the tag can be obtained. The tags are encoded with information, which serves to identify with particularity the vehicle to which they are attached. As mentioned above, any attempt to alter the tags, remove the tags and/or attach them to another vehicle destroys the tag or renders them unusable (e.g., nullifies the same).

Thus, the tags may be associated with, attached to, held by, or embedded in the object. The tags may be custom built or may be the same or similar to those described in any of a very large number of references including, for example, U.S. Pat. No. 5,682,143 to Brady et al., U.S. Pat. No. 4,063,229 to Welsh et al., U.S. Pat. No. 4,242,663 to Slobodin, and U.S. Pat. No. 4,646,090 to Mawhinney, all incorporated herein by reference. Further, tags are commercially available from any of a number of sources including Motorola, Texas Instruments, etc. Furthermore, other types of tags may be employed in addition or alternatively to those described above, such as magnetic tags, RF tags according to U.S. Pat. No. 5,581,257, "Radio Frequency Automatic Identification System" by Greene et al., incorporated herein by reference, etc. Moreover, in other applications, the tags may include a Smart Card, a bar code, a biometric identifier, etc. For the exemplary embodiment below, for convenience, it will be assumed that the tag is an RFID tag.

A receiver/tag reader 103 (e.g., a radio frequency (RF) receiver/tag reader), including an antenna 103a, is provided for interrogating/reading the RFID tags 101.

A camera system 104 (e.g., a digital camera such as a charge-coupled device (CCD) or the like) is provided for recording the images from the object 102 including the tags 101. The camera 104 is operatively coupled to the RF receiver 103 such that as the camera obtains an image of the object of interest including the tags, the tags are simultaneously interrogated and read by the RF receiver 103.

A composite generator 105 is provided for receiving inputs from both the camera 104 and tag reader 103.

Specifically, the tag ID information from the RF reader 103 is encoded along with a time stamp (e.g., time of output of interrogation pulse and time of receipt of interrogation information from the tag(s)) and other desired information, such as the focal length of the camera 104, or a hash (e.g., possibly encrypted or non-encrypted) of the digital image acquired by the camera 104.

As a result, the composite generator 105 generates the composite data.

The encoded data can be attached as an attached signature as disclosed for example, in U.S. Pat. No. 5,499,294, incorporated herein by reference in its entirety, or as a "fragile watermark".

An imperceptible watermark is an alteration of the data set which is barely, or not at all, perceptible to a human, but can be recognized by a machine such as a computer. Other than to the computer, the watermark should be essentially invisible. The general principle of such watermarking has been disclosed, for instance, in "Digital Watermarking for High-quality Imaging", by M. M. Yeung et al., *Proceedings of the IEEE Signal Processing Society Multimedia Workshop,* Princeton, N.J., 1997. Fragile watermarks (e.g., watermarks which allow a user to recognize that an image is authentic and that it has not been altered) can be used. Instead of using watermarks, one can also attach an authentication message to an image, as in U.S. Pat. No. 5,499,294 to Friedman, incorporated herein by reference and mentioned above.

To prevent the RF reader 103 from reading tags which are not attached to the object 102, the antenna in the RF reader preferably is a directional antenna and the antenna/RF receiver is coupled to move with the digital camera 104. Thus, the directional antenna preferably receives RF signals only in the direction which the optical camera is pointing, thereby to ensure that both optical image data and RF data are originating from the same location.

Modifications of the First Preferred Embodiment

Besides the preferred embodiment above as shown in FIG. 1, the following modifications can be made within the spirit and scope of the present invention. For ease of understanding and as shown in FIG. 2, a block diagram of a system 200 is illustrated with the following modifications from system 100. Since such modifications are optional from the basic configuration shown in FIG. 1, the modifications are shown with broken lines. Further, it is noted that the modifications below may be employed either singly or in combination, for greater benefit.

For example, besides the tags 101, RF receiver 103, camera 104, and composite generator 105, the system 200 may include a device 106 (e.g., a delay sensor or delay sensing subsystem 106) for measuring the delay time between the initiation of the RF reader pulse and the reception thereof (e.g., by the tag reader 104). In this mode, it can be sensed whether RF relay stations have been used to circumvent the system and provide a false image.

Specifically, since the velocity of electromagnetic waves is $3 \times 10^8$ meters/second, a picture that encompasses the repaired car should require on the order of about 3–5 meters distance between the camera and the car. This distance can be measured by measuring the focal length of the optical camera 104. Thus, typical delays with respect to an initiation signal will be on the order of about 20–33 nanoseconds. Any times significantly different (e.g., longer) than that would indicate that a relay setup has been used to relay the RF signals from another location. The delay times preferably are also recorded and encoded into the composite data by the composite generator 105. The delay sensor 106 could be advantageously employed with the time stamp sensor/encrypter 109 discussed below.

Another modification to the preferred embodiment of FIG. 1 is that the encoding of the data from the RF tag and other information may be input from the composite generator 105 to an encryption device 107 using either of a public key or a private key cryptography, as described, for example, in U.S. Pat. No. 5,499,294, to Friedman, incorporated herein by reference.

Thus, the encoded data is further encrypted using either public key cryptography or private key cryptography, to provide a further level of reliability and security. In either case, the appropriate decryption keys are needed to decipher the encoding data, as would be known.

An exemplary subsystem 300 for encryption is shown in FIG. 3 in which a camera image 302 of an object and preselected properties 304 of the object, and private key information are input to an encryption device 308. The encryption device 308 in turn produces an encrypted image 310 for authentication. A description of the specific cryptographic techniques (e.g,. SK/PK pairs and hash functions) can be found in "Handbook of Applied Cryptography", Alfred J. Menezes et al., CRC Press, 1997.

Returning to FIG. 3, a digital image of an object represents the reflection of photons of a surface which is recorded by the digital camera system 104 of FIG. 1 or standard photographic material. The image represents the current state of the object and is often used as verification. For example, as mentioned above, a photograph of the accident damage of an automobile may be used as verification for an insurance claim. The manipulation of the image is possible.

Thus, in FIG. 3, a three-dimensional object is probed and at least two data sets including the image 302 and a property of the object 304 are encrypted by encryption device 306 together as shown in FIG. 3. For example, this may be the camera image and an interferometric (e.g., either by way of electromagnetic or acoustic waves) measurement of the object. The combined data set 310 provides authentication that this data set represents the actual object and is not a manipulation of a simulated object or of an image of the object subsequently photographed from a screen or some other two dimensional medium.

Figure 4:
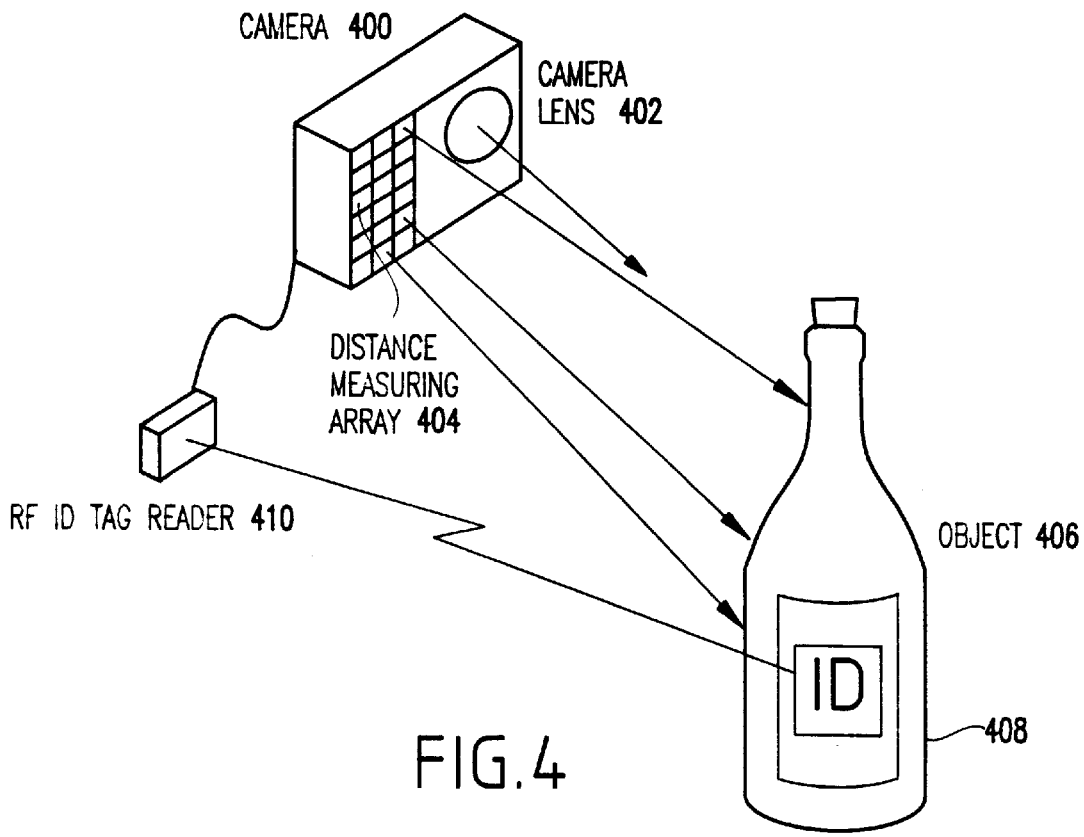
FIG. 4 illustrates a camera system with means for measuring distance and/or physical measurements of an object.

In FIG. 4, an example of providing such information is shown. The object 406 is a bottle of wine, which may be photographed with a digital camera 400. To verify that the picture is actually an image of the three-dimensional object it is purported to be, a distance and/or dimension measuring device 400 is used to measure the distance from the object and/or the dimensions of the object. Such a device may use electromagnetic waves and/or acoustic waves emanating from the camera and whose echo is received by the camera substantially at the time of image capture. Additionally, the wine bottle includes an electronic tag 408, and this information is also be sent to an RF ID tag reader 410 and recorded by the camera 400. All information is combined and encrypted as per FIG. 3 to represent the object.

While the example of FIG. 4 only uses distance, many aspects and properties of the object could be recorded including but not limited to: weight, density which would show three-dimensional voids in the object, topographic surface measurements, vibration level, acoustic emissions, radioactivity level, nuclear magnetic resonance (NMR) spectrum, infrared spectrum, electromagnetic radiation, etc.

Returning to FIG. 2, yet another modification of the basic system of FIG. 1 includes providing the camera 104 with a zoom lens 108 and automatically taking a plurality of pictures with a plurality of different (e.g., preferably random) zoom settings. The zoom settings are encoded into one or both of the images.

Another modification includes a system as above where the reader also contains an RF tag 101 so that both the reader's RF tag and those of the object 102 are recorded when a picture is taken. This combination makes it more difficult to emulate the reader 103 and camera 104 for purposes of fraud. Further, the digital camera with the tag could be registered to a specific repair shop/entity taking the photo for even greater reliability and security.

An additional modification to the system above includes providing at least one tag 501 (and more preferably a plurality of tags 501) containing a variety of dipoles, rather than silicon technology, and that is read in an analog fashion. One such implementation of tags is described in U.S. Pat. No. 5,581,257, "Radio Frequency Automatic Identification System" by Greene et al., incorporated herein by reference. In such tags 501, wires 502 are randomly distributed in, for example, a paper packaging/housing 503 (e.g., formed of a paper "mush" or pulp). Such tags cannot be duplicated by simply reading the tag. The signature corresponding to these tags is prerecorded, and is kept in a data base (e.g., at the insurance company, etc.). The tag's signature is recorded by using radio frequency but is read in a manner that differs from a typical silicon RFID tag. Because of the random arrangement, if the configuration of the distribution of wires is changed, then the prerecorded signal cannot be replicated.

Yet another modification would be to provide a time stamp sensing and encrypting device 109 for sensing and encrypting a time stamp onto the image recorded by the camera system. The time stamp represents a time at which the image was recorded by the camera system, and would provide another level of authenticity for the image.

Thus, the present invention deters fraudulent activity of taking a picture of an object that is not the object that was supposed to be represented, for example, for insurance purposes. Deterrence is provided since highly reliable detection of such fraudulent activity will occur. For example, due to the highly reliable detection made possible by the present invention, fraudulent activities such as recording the image of an undamaged car which looks similar to a car that has been in an accident, and then sending such an image to the insurance company for repair payments when the repair has actually not been undertaken (or in some cases not even needed), will be deterred.

Furthermore, the present invention prevents or at the very least deters the setting up of relay stations which can transmit a false or counterfeit remote image.

While the invention has been described in terms of preferred embodiments, those skilled in the art will recognize that the invention can be practiced with modification within the spirit and scope of the appended claims.

For example, other parameters could be measured such as smell or sound, so long as the measuring instrument (e.g., a "sniffer" or auditory instrument or the like) has a tag therein. A representation of the parameter could be placed on the photograph for reliability and authenticity.

Additionally, it is noted that the time stamp described above may be indexed to a national broadcast time signal emitted, for example, from the National Institute of Standards and Technology (e.g., over their broadcast call letters "WWV") or over a network such as the World-Wide-Web. Such a time would be encrypted into the photograph or image of the object in interest for high reliability of the authentication.

Further, the tags above have been described as tags which are interrogated by an external field. "Active" electronic tags could be used additionally or alternatively to the passive tags, for emitting identifying information.

Moreover, while in the description of the exemplary, non-limiting embodiment and modifications above has addressed an automobile, the present invention is equally applicable to other objects such as mass-produced consumer electronics such as televisions, video tape recorders, and the like, other motor vehicles such as trucks, motorcycles, and boats, airplanes, artwork, expensive clothing, etc. Thus, many inanimate objects would find great benefit with the invention.

Further, the system of the present invention could be easily used to identify animate objects (e.g., people, animals, etc.). In such a case, the animate object can be identified by taking a picture (e.g., obtaining an image) of the animate object while simultaneously obtaining other data (e.g., confirming biometric information such as iris/retinal shape, dental configuration, etc.). Further, the animate objects may carry a tag (e.g., a radio frequency (RF) tag, a magnetic tag, a Smart Card, a bar code, a biometric identifier, etc.). Thus, animate and inanimate objects can be easily authenticated with the present invention.

What is claimed is:

1. A system comprising:
    at least one identifier associated with the object;
    a receiver for interrogating said at least one identifier to produce identification information;
    a camera system for recording a first image from the object in a first state including said at least one identifier;
    a composite generator for encoding said identification information from said receiver, as encoded data, along with said first image acquired by said camera system, and generating a first set of composite data;
    a camera system for recording a second image from the object in a second state including said at least one identifier; and
    a composite generator for encoding said identification information from said receiver, as encoded data, along with said second image acquired by said camera system, and generating a second set of composite data.

2. The system according to claim 1, wherein said at least one identifier comprises a radio frequency (RF) identifier.

3. The system according to claim 1, wherein said at least one identifier comprises a biometric identifier.

4. The system according to claim 1, wherein said at least one identifier comprises at least one of a bar code and a Smart Card.

5. The system according to claim 1, wherein said receiver comprises a radio frequency (RF) receiver.

6. The system according to claim 1, wherein said at least one identifier is unique to at least one of said object and a feature of said object.

7. The system according to claim 1, wherein a plurality of identifiers are attached to said object.

8. The system according to claim 1, wherein said camera system comprises a digital camera.

9. The system according to claim 1, wherein said encoded data is attached to said image as one of an attached signature and a watermark.

10. The system according to claim 1, wherein said receiver comprises a directional antenna for preventing said receiver from reading an identifier other than said at least one identifier, such that said directional antenna receives radio frequency (RF) signals from identifiers only in a direction to which said camera system is pointed.

11. The system according to claim 1, further comprising:
    a delay sensing subsystem, coupled to said receiver, for measuring a delay time between initiation of a pulse of said receiver directed to said object and reception thereof by said receiver.

12. The system according to claim 1, wherein said identification information includes at least one of a distance between said camera system and the object and a focal length of said camera system.

13. The system according to claim 12, further comprising:
    a delay sensing subsystem, coupled to said receiver, for measuring a delay time between initiation of a pulse of said receiver directed to said object and reception thereof by said receiver.

14. The system according to claim 13, wherein said delay time is recorded and encoded into the composite data by said composite generator.

15. The system according to claim 1, further comprising:
    an encryption device coupled to said composite generator, wherein each of said first and second images are authenticated by encoding of the identification information from said at least one identifier and predetermined information are input from said composite generator to said encryption device using one of a public key and a private key.

16. The system according to claim 1, wherein said camera system includes a zoom lens system and automatically forms a plurality of images with a plurality of different zoom settings of said zoom lens system.

17. The system according to claim 16, wherein said zoom settings comprise random zoom settings.

18. The system according to claim 16, wherein said zoom settings are encoded into at least one of the plurality of images.

19. The system according to claim 1, wherein said receiver includes an identifier attached thereto, such that both said identifier of said receiver and said at least one identifier of said object are recorded when said camera system takes an image of said object.

20. The system according to claim 1, wherein said at least one identifier contains a plurality of dipoles.

21. The system according to claim 1, wherein said at least one identifier comprises silicon.

22. The system according to claim 1, wherein a signature corresponding to said at least one identifier is prerecorded.

23. The system according to claim 22, wherein the signature of said at least one identifier is prerecorded by using radio frequency.

24. The system according to claim 1, wherein said at least one identifier comprises a radio frequency identification tag.

25. The system according to claim 1, wherein each of said first and second images is encoded with a time stamp.

26. The system according to claim 1, further comprising means for encrypting a time stamp in each of said first and second images, said time stamp representing a time at which each of said first and second images was recorded by said camera system.

27. The system according to claim 1, further comprising means for sensing a time that each of said first and second images is recorded by said camera system, embedding a time stamp in each of said first and second images, and for encrypting each of said first and second images including said time stamp.

28. The system according to claim 1, wherein said object comprises an inanimate object.

29. The system according to claim 28, wherein said object comprises one of a motor vehicle and artwork.

30. The system according to claim 1, wherein said object comprises an animate object.

31. The system according to claim 1, wherein said at least one identifier comprises a tamper-resistant identifier such that any of alteration and removal of said at least one identifier nullifies said at least one identifier.

32. A method of authenticating an object, comprising:
associating at least one identifier with the object;
interrogating said at least one identifier to generate identification information;
recording a first image from the object in a first state including the at least one identifier; and
encoding said identification information, based on said interrogating said at least one identifier, along with said first image recorded, to generate a first set of composite data;
recording a second image from the object in a second state including the at least one identifier; and
encoding said identification information, based on said interrogating said at least one identifier, along with said second image recorded, to generate a second set of composite data.

33. The method according to claim 32, wherein said object comprises an inanimate object.

34. The method according to claim 33, wherein said object comprises one of a motor vehicle and artwork.

35. The method according to claim 32, wherein said object comprises an animate object.

36. The method according to claim 32, wherein said at least one identifier comprises a radio frequency identifier.

37. The method according to claim 32, wherein said at least one identifier comprises a biometric identifier.

38. The method according to claim 32, wherein said at least one identifier comprises at least one of a bar code and a Smart Card.

39. The method according to claim 32, wherein said at least one identifier is unique to at least one of said object and a feature of said object.

40. The method according to claim 32, wherein said at least one identifier comprises a tamper-resistant identifier,
said method further comprising nullifying said tamper-resistant identifier responsive to any of alteration and removal of said at least one identifier.

41. A method of authenticating an object, comprising:
simultaneously extracting at least two kinds of information associated with said object in a first state;
simultaneously, with said extracting, jointly encrypting said at least two kinds of information; and
decrypting said at least two kinds of information, to verify authenticity of said object in a first state;
simultaneously extracting at least two kinds of information associated with said object in a second state;
simultaneously, with said extracting, jointly encrypting said at least two kinds of information; and
decrypting said at least two kinds of information, to verify authenticity of said object in a second state.

42. The method of claim 41, wherein said extracting comprises recording an image of the object and obtaining an intrinsic physical property of the object.

43. The method of claim 42, wherein said image comprises a photographic image, and wherein said intrinsic property of the object includes a topographic measurement of the surface of the object.

44. The method of claim 42, wherein said image comprises a photographic image, and wherein said intrinsic property of the object includes at least one of density and weight of the object.

45. The method of claim 44, wherein the density reveals three-dimensional voids in the object.

46. The method of claim 42, wherein said image comprises a photographic image, and wherein said at least one intrinsic property includes a magnetic property of the object.

47. The method of claim 41, wherein one of the two kinds of information comprises an electromagnetic radiation of the object.

48. The method of claim 41, wherein one of the two kinds of information is from one of an electronic tag emitting identifying information and from a passive tag revealing one of said two kinds of information when prompted by an external field.

49. The method of claim 41, wherein at least one of said two kinds of information is applied in a time-sequenced order.

50. The method according to claim 41, wherein one of the at least two kinds of information comprises a digital image of said object, said object comprising a three-dimensional object.

51. The method according to claim 41, wherein said object comprises an inanimate object.

52. The method according to claim 41, wherein said object comprises one of a motor vehicle and artwork.

53. The method according to claim 41, wherein said object comprises an animate object.

54. The method according to claim 41, wherein said two kinds of information include an image information of said object and biometrics information uniquely associated with said object.

55. The method according to claim 41, wherein one of the two kinds of information is from a radio frequency identifier associated with the object.

56. The method according to claim 41, wherein one of the two kinds of information is from a biometric identifier associated with the object.

57. The method according to claim 41, wherein one of the two kinds of information is from at least one of a bar code and a Smart Card associated with the object.

58. The method according to claim 41, wherein one of the two kinds of information is from at least one identifier associated with the object, said at least one identifier comprising a tamper-resistant identifier, said method further comprising nullifying said tamper-resistant identifier responsive to any of alteration and removal of said at least one identifier.

59. The system of claim 1, wherein said first state of said object is damaged.

60. The system of claim 1, wherein said second state of said object is repaired.

61. The system of claim 1, wherein said first set of composite data and said second set of composite data are submitted to an insurance company.

62. The system of claim 1, wherein said first set of composite data is compared to said second set of composite data.

63. The system of claim 1, wherein each set of said first and second sets of composite data comprises a composite photograph.

64. The method of claim 32, wherein said first state of said object is damaged.

65. The method of claim 32, wherein said second state of said object is repaired.

66. The method of claim 32, further comprising:

submitting said first set of composite data and said second set of composite data to an insurance company.

67. The method of claim 32, further comprising:

comparing said first set of composite data to said second set of composite data.

68. The method of claim 32, wherein each set of said first and second sets of composite data comprises a composite photograph.

69. The method of claim 41, further comprising:

placing said first state and said second state in a time-sequenced order.

* * * * *